United States Patent
Chen et al.

(10) Patent No.: US 8,559,698 B2
(45) Date of Patent: Oct. 15, 2013

(54) METHOD OF INSPECTING CHIP DEFECTS

(75) Inventors: Ming-Fu Chen, Hsinchu (TW); Chun-Chao Chang, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 28 days.

(21) Appl. No.: 13/416,041

(22) Filed: Mar. 9, 2012

(65) Prior Publication Data
US 2013/0236086 A1 Sep. 12, 2013

(51) Int. Cl.
*G06K 9/00* (2006.01)
*G06K 9/48* (2006.01)

(52) U.S. Cl.
USPC .......................................... 382/149; 382/199

(58) Field of Classification Search
USPC ............. 382/141–145, 149, 199; 348/92, 125
See application file for complete search history.

(56) References Cited

U.S. PATENT DOCUMENTS 6,448,783 B1 * 9/2002 Fukuda ........................ 324/537
7,310,585 B2 * 12/2007 Brodsky et al. ................ 702/81

\* cited by examiner

*Primary Examiner* — Daniel Mariam
(74) *Attorney, Agent, or Firm* — Jackson IPG PLLC

(57) ABSTRACT

The present invention provides a method for inspecting chip defects. A raw image of a chip is used to extract a chip image. A binary chip edge image obtained from the chip image is used for inspecting defects, coordinated with statistics of edge pixels. During packaging the chip, defects that exceed inspection criteria and affect chip quality are quantitatively and accurately inspected out. The present invention has a simple procedure with high performance on inspecting defect modes and defect sizes. Thus, the present invention greatly improves performance and accuracy of inspections on chip defects for further saving a great amount of labor, time and cost.

11 Claims, 11 Drawing Sheets

US 8,559,698 B2

METHOD OF INSPECTING CHIP DEFECTS

TECHNICAL FIELD OF THE INVENTION

The present invention relates to inspecting chip defects; more particularly, relates to using a raw image of a chip and a binary chip edge image of the chip to extract a chip image and inspect chip defects for quantitatively and accurately inspecting out defects that exceed inspection criteria and affect chip quality.

DESCRIPTION OF THE RELATED ARTS

A general defect inspecting system uses a frame array imaging device. Because of fall-off effect and geometric deformation, every image has to be processed through radiometric and geometric calibration. Besides, for a chip having a length longer than the length of the frame image, image acquisition with pauses for taking images of the chip and image mosaic are required to form a whole chip image for inspection. All these take complex acquisition control and image processing and spend a lot of time while resulting in bad performance on defect inspection. However, almost only this kind of inspection devices is found in the market.

Hence, the prior arts do not fulfill users' requirements on actual use.

SUMMARY OF THE INVENTION

The main purpose of the present invention is to use a binary chip edge image of a chip for inspecting defects and greatly improving performance and accuracy of the inspections.

To achieve the above purpose, the present invention is a method of inspecting chip defects, comprising steps of (a) acquiring an image of a chip and (b) inspecting defects of the chip, where, in step (a), a raw image of the chip is processed through edge detection to obtain a raw edge image; after obtaining the raw edge image, a plurality of locations of edge points of possible boundaries and a plurality of locations of possible corners are obtained through chip boundaries derivation and chip corners derivation; equations of parameters derivation of affine transformation of a plurality of coordinates of a chip image are obtained; according to coordinate systems of the raw image and the chip image and according to the equations and parameters of affine transformation, images of the chip are acquired and segmented through chip image segmentation based on the raw image and the raw edge image to obtain the chip image and the chip edge image; in step (b), for various defect modes and various potential defect regions, a scan window is used to process various inspections on the chip edge image in a way of region by region; statistics of edge pixels at two inter-perpendicular spatial directions are gathered; and, according to numbers of pixels obtained from the statistics of edge pixels, the inspections of crack defects, chipping defects and residual-glue defects are processed. Accordingly, a novel method of inspecting chip defects is obtained.

BRIEF DESCRIPTIONS OF THE DRAWINGS

The present invention will be better understood from the following detailed descriptions of the preferred embodiment according to the present invention, taken in conjunction with the accompanying drawings, in which FIG. 1 is the flow view showing the preferred embodiment according to the present invention;

DESCRIPTION OF THE PREFERRED EMBODIMENT

The following descriptions of the preferred embodiment are provided to understand the features and the structures of the present invention.

Figure 1:
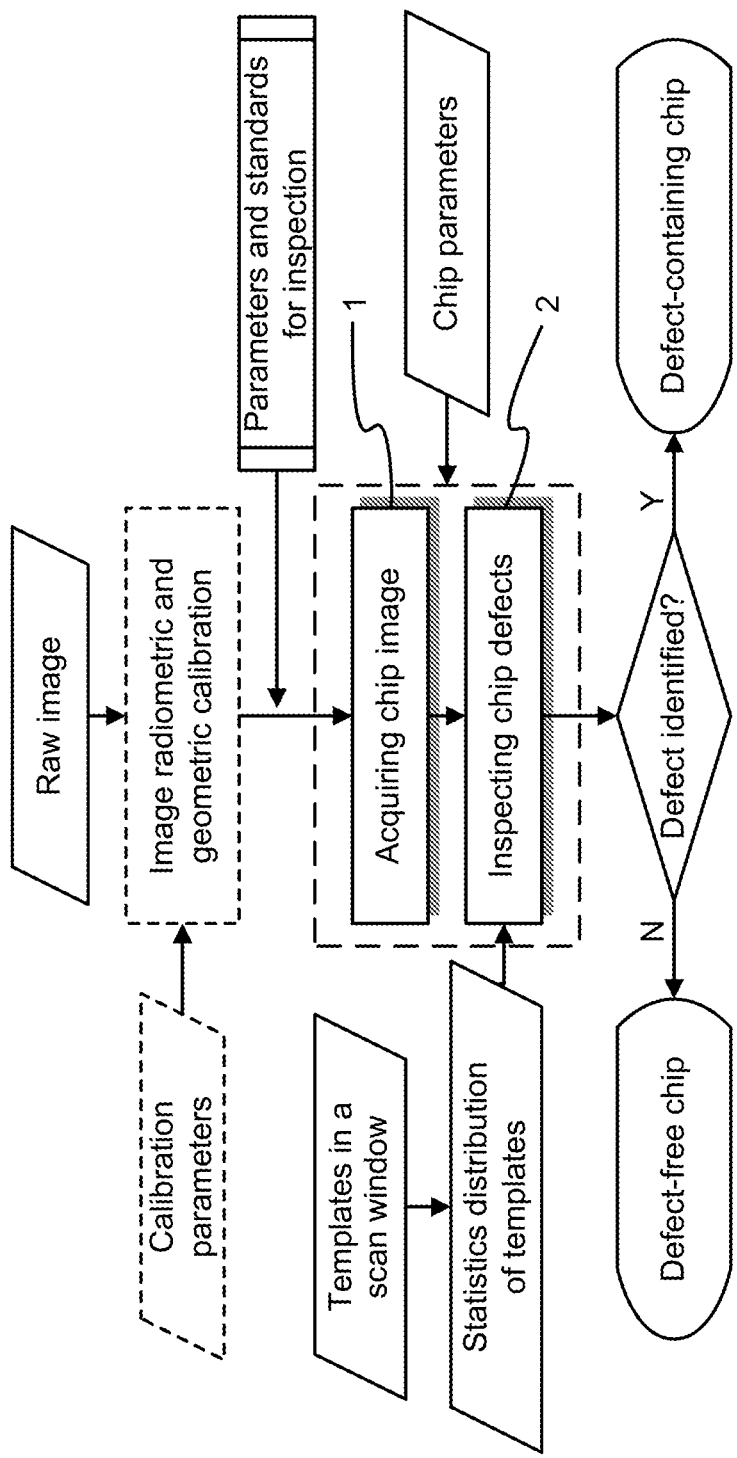

Please refer to FIG. 1, which is a flow view showing a preferred embodiment according to the present invention. As shown in the figure, the present invention is a method of inspecting chip defects, where chip defects are inspected based on a binary chip edge image to greatly improve inspection performance and inspection accuracy. On using the present invention, based on a raw image of a chip and a raw edge image of the chip, defects on the chip exceeding inspection criteria are inspected quantitatively and precisely through the following steps:

(a) Acquiring images of chip 1: An edge image of a chip is acquired through edge detection; chip boundaries derivation; chip corners derivation; parameters derivation of affine transformation; and chip image segmentation. Therein, a raw image of the chip is processed through the edge detection to obtain a raw edge image; after obtaining the raw edge image, a plurality of locations of edge points of possible boundaries and a plurality of locations of possible corners are obtained through the chip boundaries derivation and the chip corners derivation; equations of parameters derivation of affine transformation are obtained for a plurality of coordinates of a chip image; and, according to coordinate systems of the raw image and the chip image and according to the equations and parameters of affine transformation, images of the chip are acquired and segmented through the chip image segmentation based on the raw image and the raw edge image for obtaining the chip image and the chip edge image.

(b) Inspecting defects of chip 2: For various defect modes and various potential defect regions, a scan window is used to process various inspections on the chip edge image in a way of region by region; statistics of edge pixels at horizontal and vertical directions are gathered; and, according to numbers of pixels obtained from the statistics of edge pixels, the inspections are processed by checking whether a defect size is bigger than a related inspection threshold. Therein, the inspections comprise an inspection of crack defects (accompanied with derivations of crack angles), an inspection of chipping defects and an inspection of residual-glue defects.

The statistics of edge pixels of a mask image taken by the scan window are used to figure out a pixel number and components of crack width at horizontal and vertical directions. Thus, an angle of a crack is derived from the components of crack width as an included angle of the crack and a normal of a corresponding boundary of the chip.

In the figure, demand for image radiometric and geometric calibration depend on the characteristics and performance of the image acquiring device system used in the inspections. The present invention is based on an optical lens and a high-performance linear-array imager with small relative illumination variation and geometric distortion. Take Schneider MRV 4.5/85 lens and Basler sprint spL2048-140 km linear scanner as examples. The relative illumination variation and geometric distortion induced by the lens and the imager are 3% and 0.2% respectively. Each chip has a corresponding image, and image mosaic is not required. The chip for inspection is located at the center of lens as close as possible so as to have almost no relative illumination variation and geometric distortion induced and no influence over the inspection. Thus, since the radiometric and geometric distortion formed by the opto-mechanical module of the image acquiring device system are both small and have no influence on inspection accuracy, the inspection method of the present invention can ignore the process of image radiometric and geometric calibration; and, furthermore, can greatly improve the performance of the inspections.

The inspection system for chip defects comprises a linear-array image acquiring module, which comprises an opto-mechanical photographing module and an image acquiring module; a light control module; a defect inspection module; and an operation management module with a graphical user interface (GUI). And the inspection system can rapidly detect chip defects out automatically during chip packaging process for greatly reducing inspection costs on human labor and equipment, saving time and improving the quality control on products.

Figure 2A:
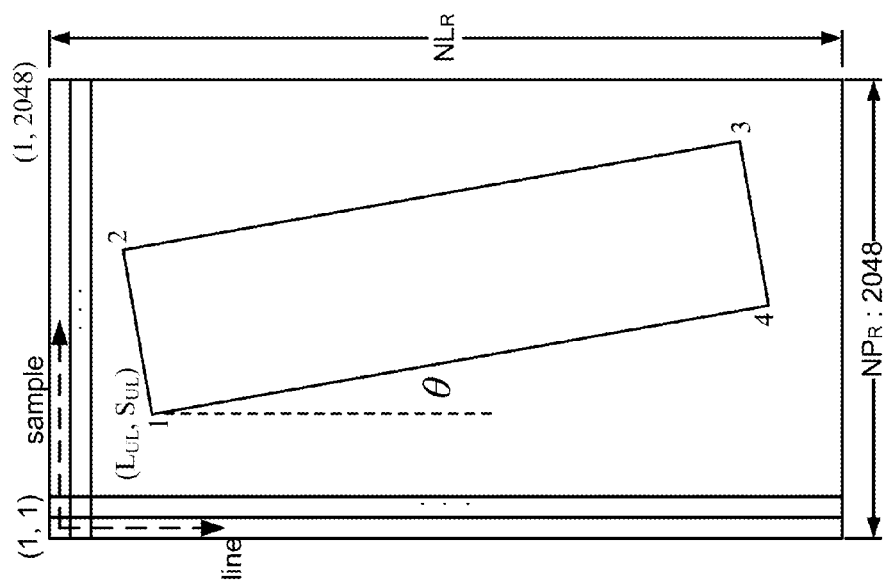
FIG. 2A and FIG. 2B are the views showing the coordinate systems of the raw image and the chip image.
Figure 2B:
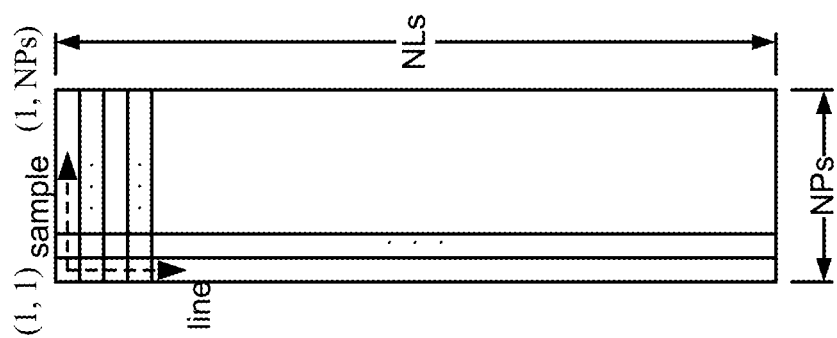

Please further refer to FIG. 2A, FIG. 2B, FIG. 3 and FIG. 4, which are views showing coordinate systems of a raw image and a chip image; a flow view showing a process of acquiring the chip image; and a view showing a chip corners derivation. As shown in the figures, a process of acquiring a chip image in step (a) acquires a region-of-interest (ROI) image from the raw image. As shown in FIG. 2A and FIG. 2B, a correspondent relationship between the two images is defined by affine transformation. Therein, sizes of the raw image and the chip image are related to a number of the sensor and a length of the chip for inspection.

Figure 3:
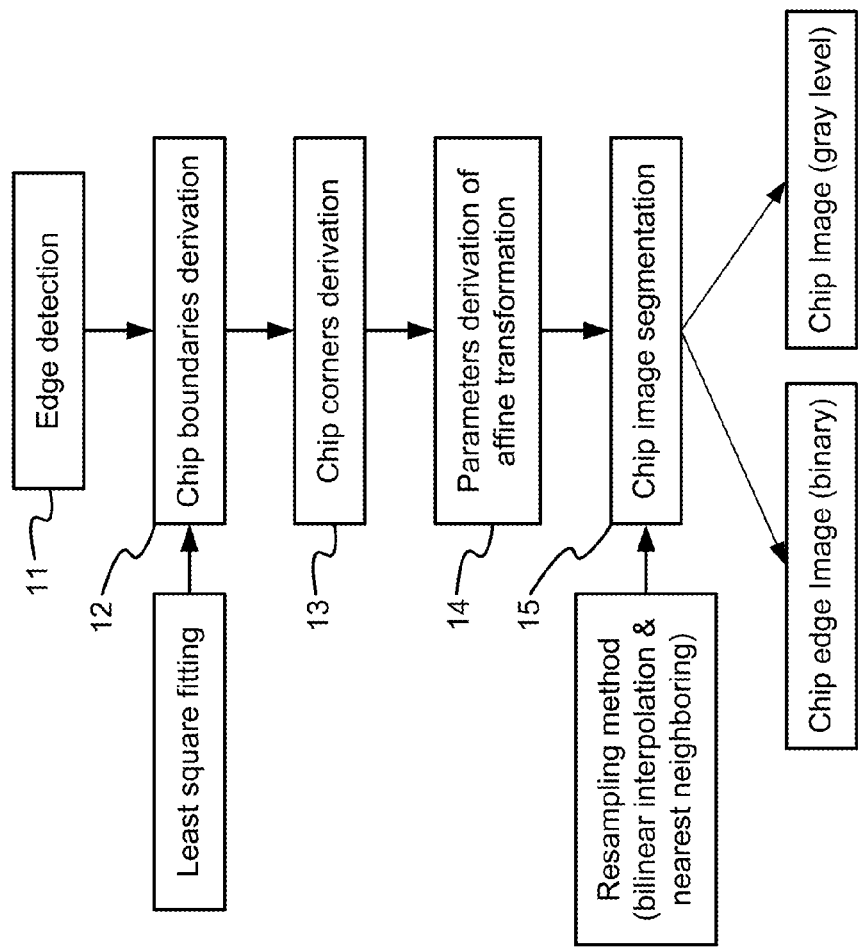
FIG. 3 is the flow view showing the chip image acquirement.

Before inspecting defects of the chip, the raw image is processed through edge detection at first. Then, an area of the chip image is acquired and segmented. In FIG. 3, through the step of acquiring chip image, a chip image and a chip edge image are obtained. This step of acquiring chip image comprises the following steps:

(a1) Edge Detection 11:

(a11) According to a length and a width of an inspected chip, a range for edge detection is set on a raw image. That is, by referring to the length and the width of the inspected chip, margins of length and width are added beyond four boundaries for saving considerable processing time to improve the performance of acquiring chip image and the following processes.

(a12) Canny edge detection is used to acquire a raw edge image from the raw image.

(a2) Chip Boundaries Derivation 12:

(a21) The raw edge image is processed through a method of connected components of 8-neighbor to connect related edge points for forming a plurality of sets of the edge points with the plurality of sets be marked.

(a22) Each area of the marked sets of the edge points is calculated; and, a threshold is set to obtain a plurality of the edge points of possible boundaries of the inspected chip.

(a23) A plurality of locations of the edge points of the possible boundaries is stored.

Figure 4:
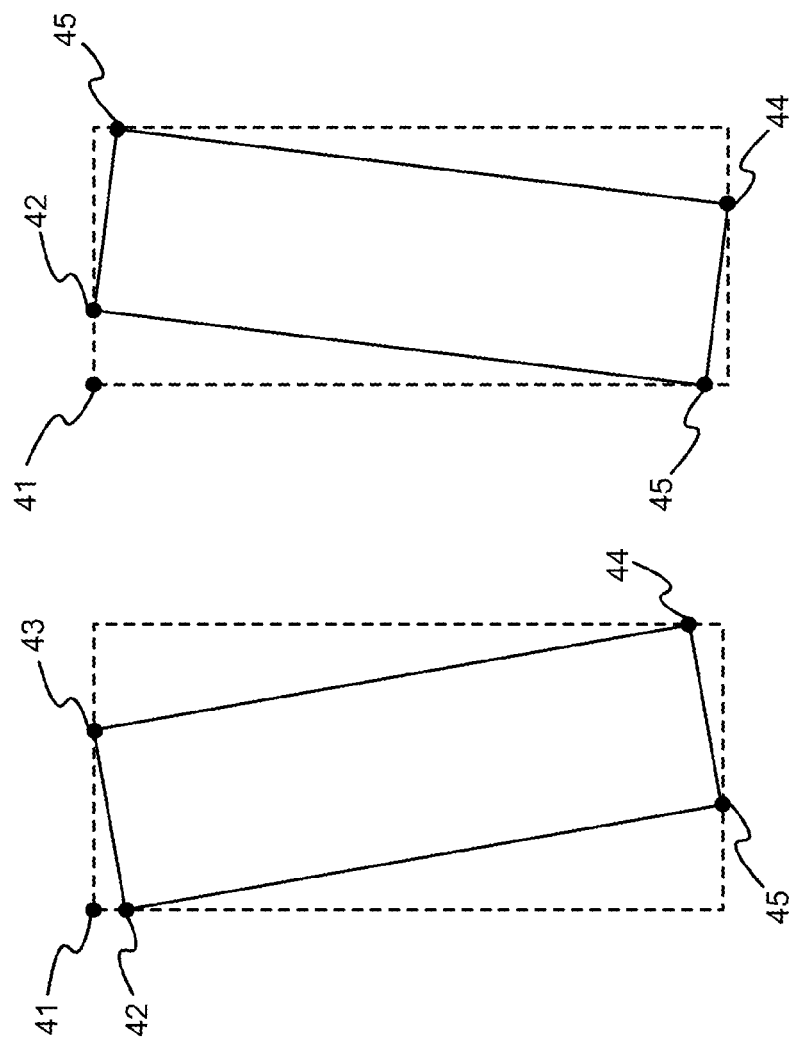
FIG. 4 is the view showing the chip corners derivation.

(a3) Chip Corners Derivation 13:

(a31) A plurality of distances of the plurality of edge points of possible boundaries to a reference point (refPoint) 41 is figured out to obtain four possible corners. As shown in FIG. 4, a first corner point 42 has a shortest distance (R1) to the refPoint 41; a second corner point 43 has a second short distance (R2) to the refPoint 41; a third corner point 44 has a longest distance (R3) to the refPoint 41; a fourth corner point 45 has a third short distance (R4) to the refPoint 41, where R1<R2<R4<R3.

(a32) Four sets of edge points are separately obtained to be marked for four possible boundaries from the plurality of edge points of possible boundaries.

(a33) Equations of four boundaries of the chip are figured out with the four sets of edge points. Because the edge points near corners may be affected by chipping, a sum of edge points near each corner (say 30 edge points) are discarded before sub-sampling the edge points with intervals. A linear equation is derived based on the selected edge points by method of least square fitting:

$$Y = \beta_0 + \beta_1 X, \tag{1}$$

where $$\beta_1 = \frac{\sum_{i=1}^{n}(X_i - \tilde{X})(Y_i - \tilde{Y})}{\sum_{i=1}^{n}(X_i - \tilde{X})^2} \tag{2}$$

and $$\beta_0 = \tilde{Y} - \beta_1 \tilde{X}. \tag{3}$$

Therein, $$\tilde{X} = \frac{1}{n}\sum_{i=1}^{n} X_i \text{ and } \tilde{Y} = \frac{1}{n}\sum_{i=1}^{n} Y_i$$

are figured out at first; then, $\tilde{X}$ and $\tilde{Y}$ are used in equation (2) to figure out $\beta_1$, and $\beta_1$ is used in equation (3) to figure out $\beta_0$; and, at last, $\beta_0$ and $\beta_1$ are used in equation (1) to obtain the line equation.

(a4) Parameters Derivation of Affine Transformation 14:

The first corner point 42 and the fourth corner point 45 are used to figure out a deflection angle of the chip and right-hand rule is followed. The equation of deflection angle is as follows:

$$\theta = \tan^{-1}\left(\frac{Y_4 - Y_1}{X_4 - X_1}\right)$$

The first corner point 42 is used as an origin point for figuring out coordinates of chip (edge) image(s). We can have following equations to describe the coordinate relationship between the raw image and chip (edge) image(s):

$$X'=(X-X_1)\cos\theta+(Y-Y_1)\sin\theta$$

$$Y'=-(X-X_1)\sin\theta+(Y-Y_1)\cos\theta$$

Therein, X and Y are coordinates of the raw image; X' and Y' are coordinates of the chip image. Thus, equations of affine transformation for parameters derivation are obtained as follows:

$$X = X' \cos\theta - Y' \sin\theta + X_1$$

$$Y = X' \sin\theta + Y' \cos\theta + Y_1$$

(a5) Chip Image Segmentation 15:

According to coordinate systems defined in FIG. 2 for the raw image and the chip image, and according to the equations of affine transformation, based on the raw image and the raw edge image, the chip image and the chip edge images are obtained through the following steps:

(a51) By using a length and a width (line, sample) of the chip image as parameters, grid systems of the chip image and the chip edge image are built.

(a52) The image grids on the coordinate systems of the chip image and the chip edge images are separately used to figure out corresponding locations of image grids on the coordinate systems of the raw image and the raw edge image by using the equations of affine transformation.

(a53) Image resampling is conducted for obtaining gray level of pixels on the chip image through bilinear interpolation and deriving value of edge pixels on the chip edge image through a nearest neighboring method. Thus, the gray level of image pixels and the value of edge pixels for all locations of the grid systems are obtained.

Please further refer to FIG. 5 to FIG. 8, which are a flow view showing chip defect inspection; a view showing various defect inspection modes and related locations; views showing statistics of edge pixels for inspection of residual-glue defects, inspection of chipping defects and inspection of crack defects; and a view showing derivation of angle of crack. As shown in the figures, after acquiring the chip image and the chip edge image, inspections of crack defects, chipping defects and residual-glue defects are processed. Besides, when the chip has any crack and the crack is bigger than a criterion, an angle of the crack is derived.

Figure 5:
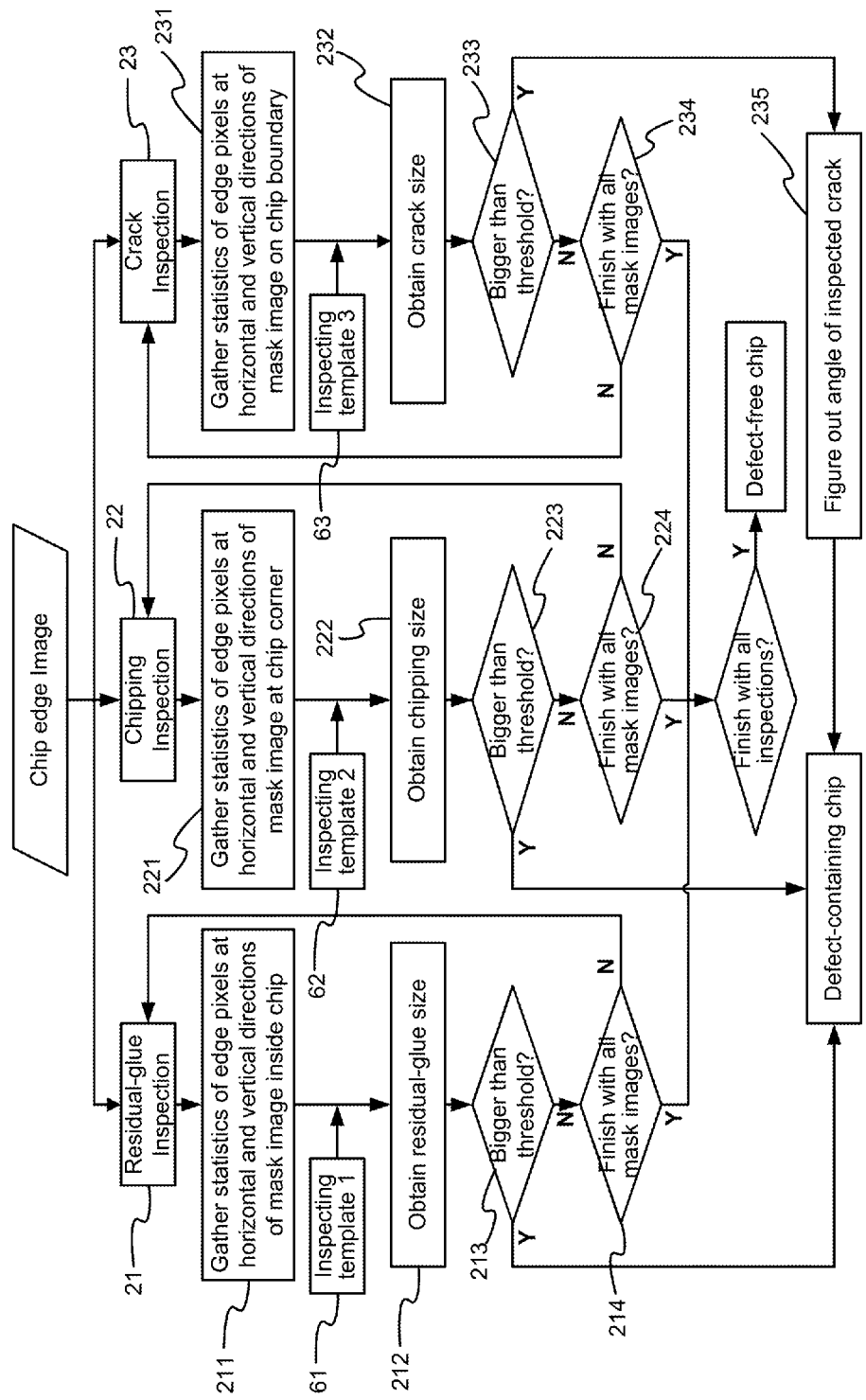
FIG. 5 is the flow view showing the chip defect inspections.
Figure 6:
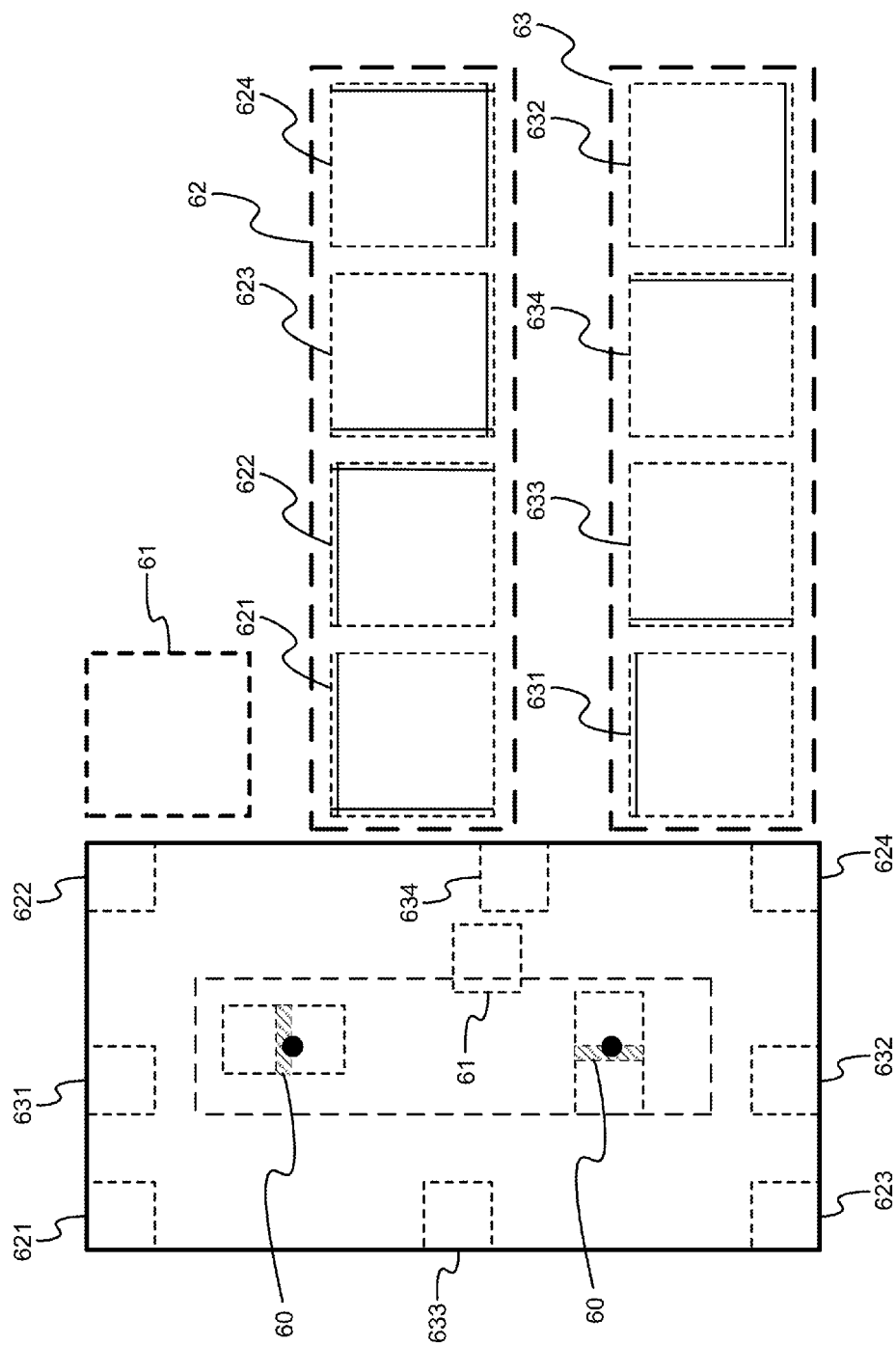
FIG. 6 is the view showing the various defect inspection modes and related locations.

According to various places of the defects, three defect modes are formed and corresponding inspecting templates are built in advance for inspecting the defects, as shown in FIG. 5 and FIG. 6:

(b1) Inspection of residual-glue defects 21: Residual-glues are located inside a chip. A first inspecting template 61 is a residual-glue-free inspecting template of the chip.

(b2) Inspection of chipping defects 22: Chippings are located at four corners of a chip. Corresponding to the four corners of the chip separately, four chipping-free inspecting sub-templates of a second inspecting template set 62 are built, comprising template_UL 621, template_UR 622, template_LL 623 and template_LR 624.

(b3) Inspection of crack defects 23: Cracks are located on four boundaries of a chip. Corresponding to the four boundaries of the chip separately, four crack-free inspecting sub-templates of a third inspecting template set 63 are built, comprising template_UP 631, template_LW 632, template_LF 633 and template_RI 634.

Figure 7A:
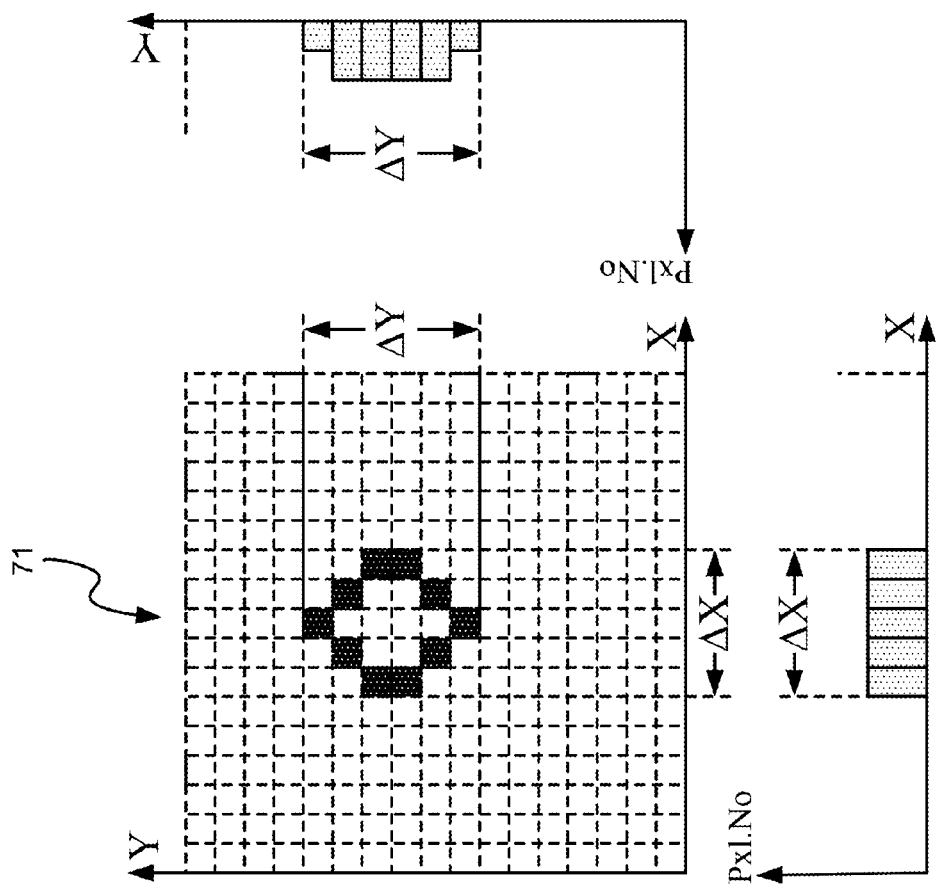
FIG. 7A is the view showing the statistics of edge pixels of the inspection of residual-glue defects.
Figure 7A:
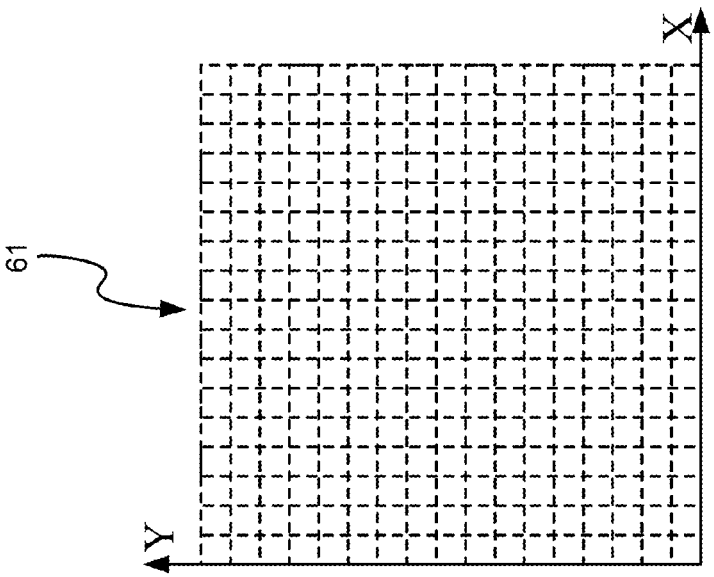
Figure 7B:
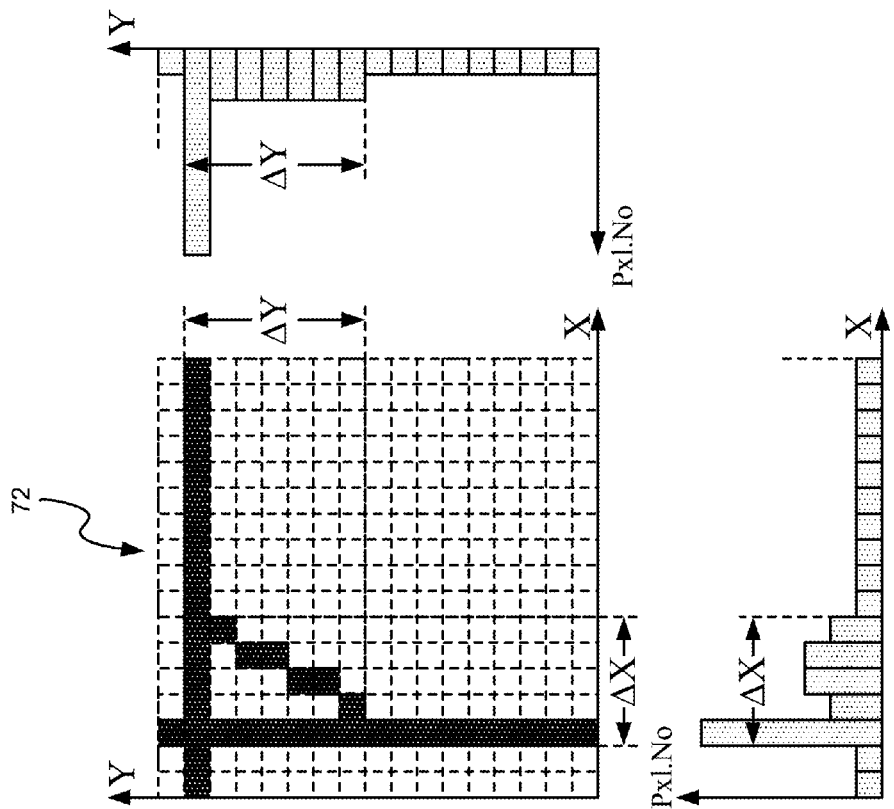
FIG. 7B is the view showing the statistics of edge pixels of the inspection of chipping defects.
Figure 7B:
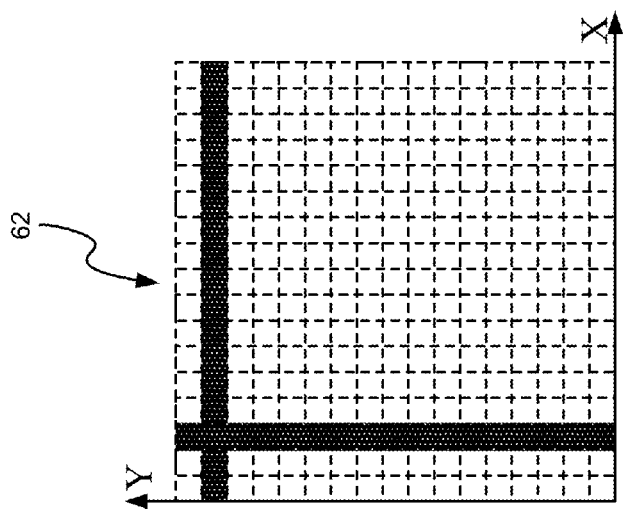
Figure 7C:
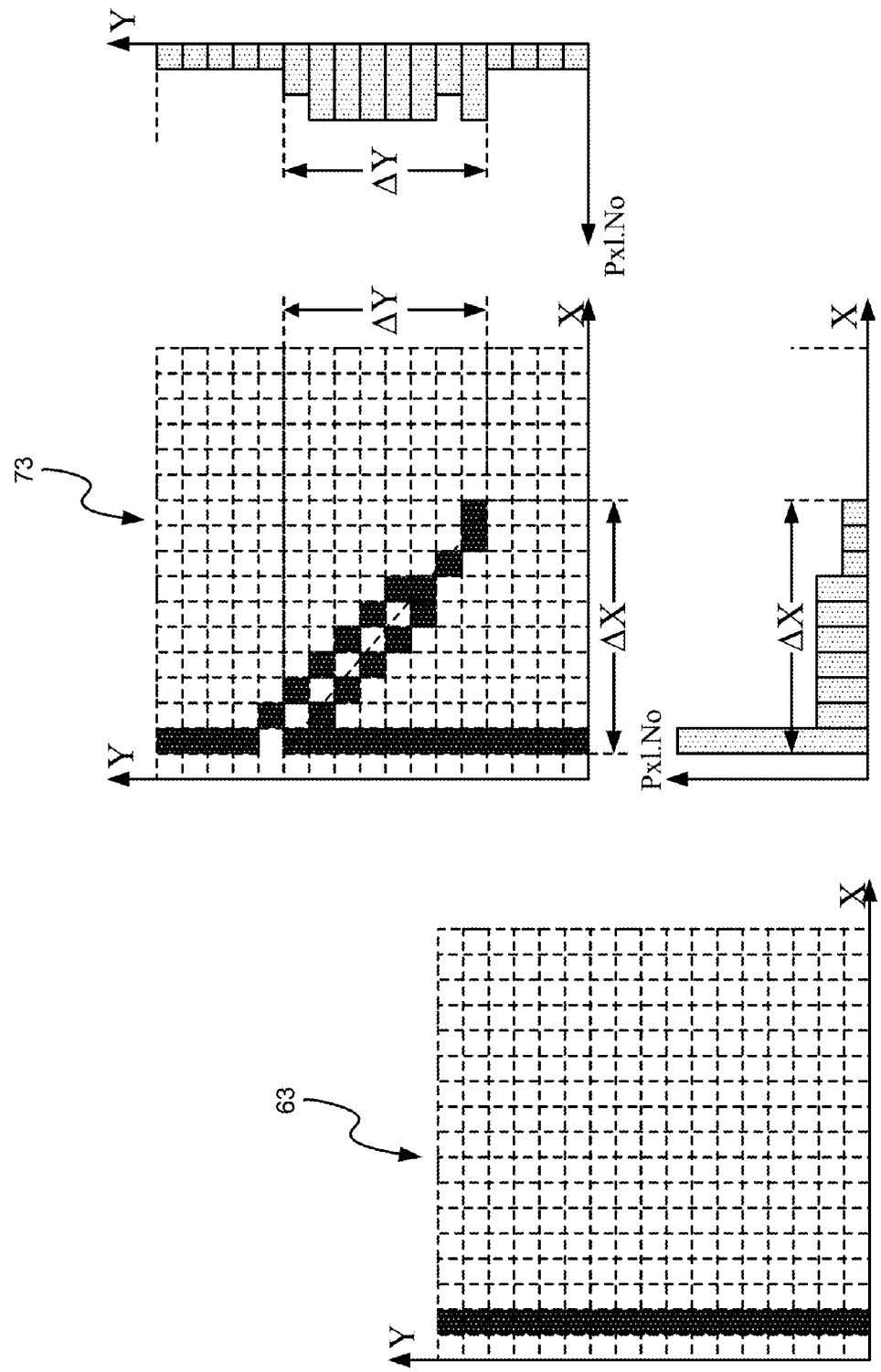
FIG. 7C is the view showing the statistics of edge pixels of the inspection of crack defects.
Figure 8:
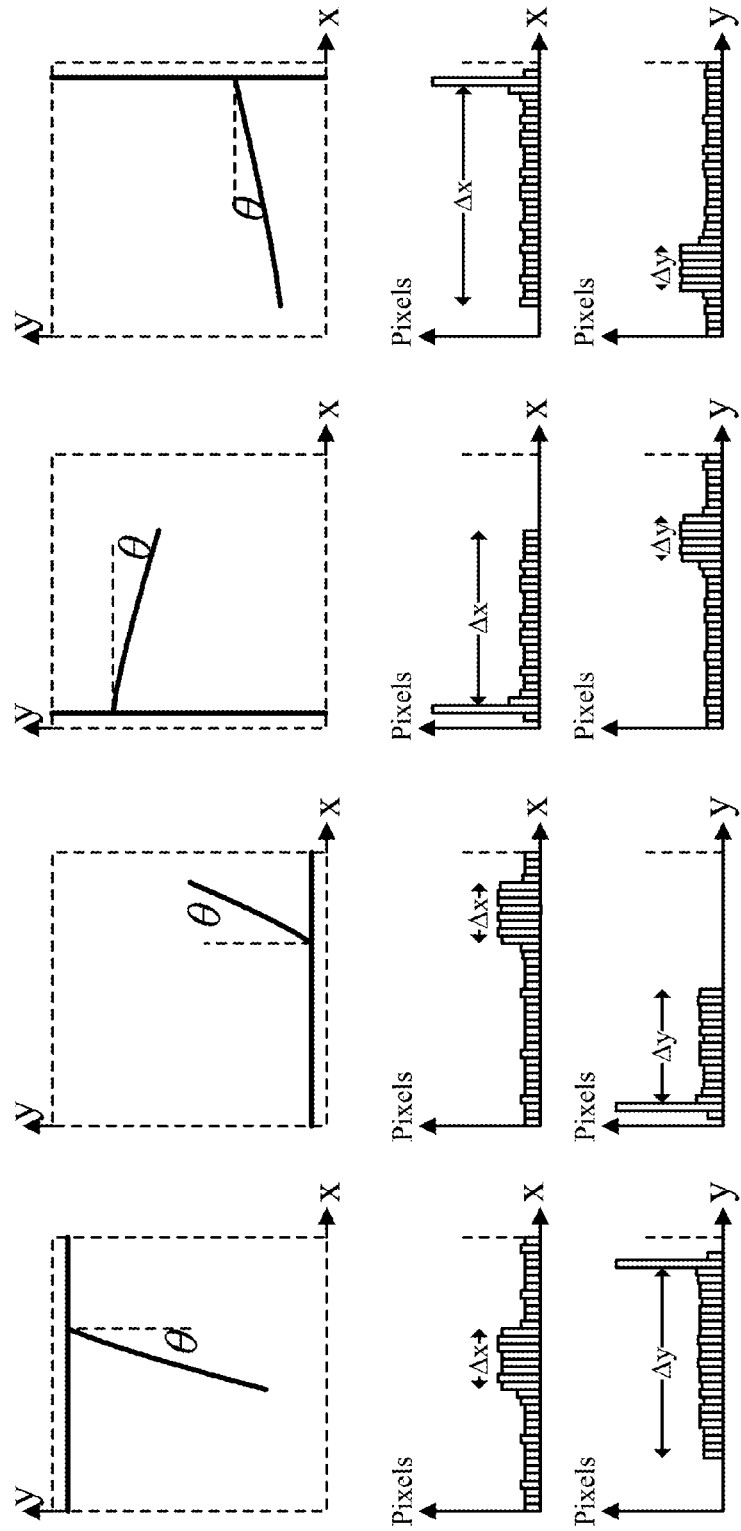
FIG. 8 is the view showing the derivation of angle of crack.

The inspecting template sets and mask images for the three defect modes are shown in FIG. 7A to FIG. 7C:

(b1) Inspection of Residual-Glue Defects:

(b11) According to a size of a scan window (to say 21*21 pixels for example) set for the inspection of residual-glue defects, beginning from an upper left corner of a residual-glue inspection region inside the chip image, a plurality of mode-1 mask images 71 within the inspection region are built sequentially. Then, statistics of edge pixels at horizontal and vertical directions for each mask image 71 are gathered 211.

(b12) Two widths of an inspected residual-glue at horizontal and vertical directions in the first one of the mask images 72 are separately figured out comparing with the inspecting template 61, which is residual-glue-free, for coherence with the other inspections of chipping and crack defects. A bigger one of the two widths is used as a residual-glue width 212.

(b13) According to a residual-glue threshold, it is checked whether the residual-glue width is bigger than the residual-glue threshold 213. If the residual-glue width were bigger than the residual-glue threshold, a residual-glue defect is identified for the chip; or, to say, the chip is identified as defect-containing.

(b14) If the residual-glue defect were not identified, it is checked whether all of the mode-1 mask images 71 are finished with the inspection of residual-glue defects 214. If not, the scan window is moved to next position to obtain a next one of the mode-1 mask images 71 to process the inspection of residual-glue defects until finishing with all of the mode-1 mask images 71. Therein, every two neighboring ones of the mode-1 mask images 71 have an overlapping area 60 in between, to say 6 pixels for example.

(b2) Inspection of Chipping Defects:

(b21) According to a size of a scan window (to say 41*41 pixels for example) set for the inspection of chipping defects, a plurality of mode-2 mask images 72 of chipping inspection regions at four corners of the chip image are built sequentially. The inspection of chipping defects is only done with the plurality of mode-2 mask images 72 of the four corners (upper-left, upper-right, lower-left and lower right corners) of the chip image, where the mode-2 mask images of the four corners are separately corresponding to inspecting sub-templates, being chipping-free, in the mode-2 inspecting template set 62. Then, statistics of edge pixels at horizontal and vertical directions of a first one of the mode-2 mask images 72 are gathered 221.

(b22) Two components of chipping width ($\Delta X$ and $\Delta Y$) at horizontal and vertical directions of an inspected chipping in the first one of the mode-2 mask images 72 are separately figured out 222 by comparing with the mode-2 inspecting template to obtain a size of the inspected chipping. The size of the inspected chipping is figured out through an equation: $(\Delta X * \Delta Y)/2$.

(b23) According to a chipping threshold, it is checked whether the size of the inspected chipping is bigger than the chipping threshold 223. If the size of the inspected chipping were bigger than the chipping threshold, a chipping defect of the inspected chipping is identified for the chip; or, to say, the chip is identified as defect-containing.

(b24) If the chipping defect of the inspected chipping were not identified, it is checked whether all of the mode-2 mask images 72 are finished with the inspection of chipping defects 224. If not, the scan window is moved to next position to obtain a next one of the mode-2 mask images 72 to process the inspection of chipping defects until finishing with all of the mode-2 mask images 72.

(b3) Inspection of Crack Defects:

(b31) According to a size of a scan window (to say 31*31 pixels for example) set for the inspection of crack defects, a plurality of mode-3 mask images 73 of crack inspection regions on four boundaries of the chip image are built sequentially. The inspection of the crack defects is only done with the plurality of mode-3 mask images 73 of the four boundaries (upper, lower, left and right boundaries) of the chip image, where four sets of the mode-3 mask images 73 of the four boundaries of the chip image are separately corresponding to inspecting sub-templates, being crack-free, in the mode-3 inspecting template set 63. Then, statistics of edge pixels at horizontal and vertical directions of a first one of the mode-3 mask images 73 are gathered 231.

(b32) Two components of crack width (ΔX and ΔY) at horizontal and vertical directions of an inspected crack in the first one of the third mask images 73 are separately figured out 222 by comparing with the mode-3 inspecting template to obtain a size of the inspected crack. The size of the inspected crack is figured out through an equation: $\sqrt{\Delta X*\Delta X+\Delta Y*\Delta Y}$.

(b33) According to a crack threshold, it is checked whether the size of the inspected crack is bigger than the crack threshold 233. If the size of the inspected crack were bigger than the crack threshold, a crack defect of the inspected crack is identified for the chip; or, to say, the chip is identified as defect-containing.

(b34) If the crack defect of the inspected crack were not identified, it is checked whether all of the mode-3 mask images 73 are finished with the inspection of crack defects 224. If not, the scan window is moved to next position to obtain a next one of the mode-3 mask images 73 to process the inspection of crack defects until finishing with all of the mode-3 mask images 73. Therein, every two neighboring ones of the mode-3 mask images 73 have an overlapping area in between, to say 6 pixels for example.

The inspection of crack defects may further comprises the following step:

(b35) If the crack defect were identified, an angle of the inspected crack is figured out based on the two components of crack width. And the angle of the inspected crack is an included angle of the inspected crack and a normal of a corresponding boundary of the chip image, where the angle of the inspected crack on the upper or lower boundary is figured out through the following equation:

$$\theta = \tan^{-1}\left(\frac{\Delta x}{\Delta y}\right)$$

and the angle of the inspected crack on the left or right boundary is figured out through the following equation:

$$\theta = \tan^{-1}\left(\frac{\Delta y}{\Delta x}\right).$$

In the end, it is checked whether all inspections of residual-glue, chipping and crack defects are finished, so as to identify the defects of an inspected chip or, to say, identify a defect-containing chip.

The present invention uses a raw image of a chip for extracting chip images and uses a binary chip edge image together with statistics of edge pixels for inspecting defects. During packaging the chip, defects that exceed inspection criteria and affect chip quality are quantitatively and accurately inspected out. The present invention has a simple procedure with high performance on inspecting defect modes and defect sizes. Thus, the present invention greatly improves performance and accuracy of inspections on chip defects for further saving a great amount of labor, time and cost.

The present invention is a method of inspecting chip defects, where a raw image of a chip is used for extracting chip images and forming a binary chip edge image; the binary chip edge image together with statistics of edge pixels are used for inspecting defects; during packaging the chip, defects that exceed inspection criteria and affect chip quality are quantitatively and accurately inspected out; the present invention has a simple procedure with high performance on inspecting defect modes and defect sizes; and, thus, the present invention greatly improves performance and accuracy of inspections on chip defects for further saving a great amount of labor, time and cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of inspecting chip defects, comprising steps of:
    (a) acquiring a raw image of a chip; processing the raw image through edge detection to obtain a raw edge image; after obtaining said raw edge image, determining a plurality of locations of edge points of possible boundaries and a plurality of locations of edge points of possible corners through chip boundaries derivation and chip corners derivation; deriving equations and parameters of affine transformation of a plurality of coordinates of the raw image and coordinates of the determined edge points to obtain coordinates of a chip image; and, according to the coordinate systems of said raw image and said chip image and according to said equations and parameters of affine transformation, an image region of said chip is acquired and segmented through chip image segmentation based on said raw image and said raw edge image to obtain said chip image and a chip edge image; and
    (b) inspecting defects of said chip,
    wherein, for various defect modes and various potential defect regions, a corresponding size of a defect mode scan window is set and the corresponding scan window is used to process various inspections on said chip edge image in a way of region by region; statistics of edge pixels at two inter-perpendicular directions are gathered; and, according to numbers of pixels obtained from said statistics of edge pixels, said inspections are processed, said inspections for various defect modes comprising an inspection of crack defects, an inspection of chipping defects and an inspection of residual-glue defects.

2. The method according to claim 1, wherein, in step (a), a length and a width of said chip are used as parameters to obtain a range of area of said raw image to be processed through said edge detection; and wherein said raw image is processed through Canny's edge detection in said edge detection to obtain said raw edge image.

3. The method according to claim 1, wherein, in step (a), said chip boundaries derivation comprises steps of:
    (a21) processing said raw edge image through a method of connected components of 8-neighbor to connect related edge points to obtain a plurality of sets of said edge points with said plurality of sets be marked;
    (a22) obtaining each area of said marked sets of said edge points and obtaining a plurality of edge points of possible boundaries of said chip according to a threshold.

4. The method according to claim 1, wherein, in step (a), said chip corners derivation comprises steps of:
    (a31) obtaining a plurality of distances of said plurality of edge points of possible boundaries to a reference point to obtain four possible corners;

(a32) separately obtaining four sets of edge points to be marked for four possible boundaries from said plurality of edge points of possible boundaries;

(a33) obtaining equations of four boundaries of said chip with said four sets of edge points; and (a34) obtaining intersections of four boundaries of said chip through said equations of four boundaries of said chip as four exact corners of said chip.

5. The method according to claim 1, wherein, in step (a), said equations and parameters derivation of affine transformation uses equations of affine transformation as follows:

$$X = X' \cos \theta - Y' \sin \theta + X_1, \text{ and}$$

$$Y = X' \sin \theta + Y' \cos \theta + Y_1; \text{ where}$$

X and Y are coordinates of said raw image; X' and Y' are coordinates of said chip image; $X_1$ and $Y_1$ are coordinates of a first corner point of said chip image; and said coordinates have a unit of sub-pixel scale.

6. The method according to claim 1, wherein, in step (a), said chip image segmentation comprises steps of:

(a51) obtaining a size of said chip image as a parameter to obtain a grid system of said chip image and said chip edge image;

(a52) obtaining said grid system of said chip image and said chip edge image to obtain corresponding locations of a grid system of said raw image and said raw edge image by using equations of affine transformation; and (a53) processing image resampling by obtaining gray level of points of said chip image through bilinear interpolation and deriving value of edge pixels of said chip edge image through a nearest neighboring method.

7. The method according to claim 1, wherein, in step (b), a plurality of defect-free inspecting templates are obtained in advance and said plurality of defect-free inspecting templates comprises a plurality of crack-free inspecting templates, a plurality of chipping-free inspecting template and a residual-glue-free inspecting template.

8. The method according to claim 1, wherein, in step (b), said inspection of residual-glue defects comprises steps of:

(b11) according to the set size of said scan window obtained for said inspection of residual-glue defects, sequentially obtaining a plurality of mode-1 mask images of a residual-glue inspection region inside said chip image, said mask images being taken beginning from a corner of said chip image, and gathering statistics of edge pixels at two inter-perpendicular directions of a first one of said mode-1 mask images;

(b12) separately obtaining two widths of an inspected residual-glue at said two inter-perpendicular directions in said first one of said mode-1 mask images and obtaining a bigger one of said two widths as a residual-glue width;

(b13) according to a residual-glue threshold, obtaining a residual-glue defect of said inspected residual-glue when said residual-glue width is bigger than said residual-glue threshold; and (b14) when said residual-glue defect is not obtained, moving said scan window to next position to obtain a next one of said mode-1 mask images to process said inspection of residual-glue defects until finishing with all of said mode-1 mask images, wherein every two neighboring ones of said mode-1 mask images have an overlapping area in between.

9. The method according to claim 1, wherein, in step (b), said inspection of chipping defects comprises steps of:

(b21) according to the set size of said scan window obtained for said inspection of chipping defects, sequentially obtaining a plurality of mode-2 mask images of chipping inspection regions at four corners of said chip image, and obtaining statistics of edge pixels at two inter-perpendicular directions of a first one of said mode-2 mask image by comparing said first one of the mode-2 mask images with a corresponding inspecting template;

(b22) obtaining two components of chipping width at said two inter-perpendicular directions of an inspected chipping in said first one of said mode-2 mask images to obtain a size of said inspected chipping;

(b23) according to a chipping threshold, obtaining a chipping defect of said inspected chipping when said size of said inspected chipping is bigger than said chipping threshold; and (b24) when said chipping defect is not obtained, moving said scan window to next position to obtain a next one of said mode-2 mask images until finishing with all of said mode-2 mask images.

10. The method according to claim 1, wherein, in step (b), said inspection of crack defects comprises steps of:

(b31) according to the set size of said scan window set for said inspection of crack defects, obtaining a plurality of mode-3 mask images of crack inspection regions on four boundary of said chip image, and obtaining statistics of edge pixels at two inter-perpendicular directions of a first one of said mode-3 mask images by comparing said first one of said mode-3 mask images with a corresponding inspecting template;

(b32) obtaining two components of crack width at said two inter-perpendicular directions of an inspected crack to obtain a size of said inspected crack;

(b33) according to a crack threshold, obtaining a crack defect of said inspected crack when said size of said inspected crack is bigger than said crack threshold; and (b34) when said crack defect is not obtained, moving said scan window to next position to obtain a next one of said mode-3 mask images to process said inspection of crack defects until finishing with all of said mode-3 mask images, wherein every two neighboring ones of said mode-3 mask images have an overlapping area in between.

11. The method according to claim 10, wherein said inspection of crack defects further comprises a step of:

(b35) when said crack defect is obtained, obtaining an angle of said inspected crack based on said two components of crack width, said angle of said inspected crack being an included angle of said inspected crack and a normal of a corresponding boundary of said chip image.

* * * * *